July 21, 1931.　　　　L. G. BACON　　　　1,815,662

SIGNAL

Filed May 20, 1930

Inventor

Leone G. Bacon

By Clarence A. O'Brien
Attorney

Patented July 21, 1931

1,815,662

UNITED STATES PATENT OFFICE

LEONE G. BACON, OF KENT, OHIO

SIGNAL

Application filed May 20, 1930. Serial No. 454,066.

This invention relates to the general art of signals and more particularly to devices of this character which are adapted for use on fishing apparatus to indicate to the fisherman when a fish is tampering or bites at the bait on the fishing line.

The primary object of the invention is to provide, in a manner as hereinafter set forth, a signal of the aforementioned character embodying a novel construction and arrangement of flash light adapted to be expeditiously and detachably mounted on a fishing pole and having operatively associated therewith a switch also of a novel construction and arrangement which is actuated in a manner to illuminate the light by the pull exerted on the line by the fish.

Other objects of the invention are to provide a signal for use by fishermen of the character described which will be comparatively simple in construction, strong, durable, efficient in its use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1:
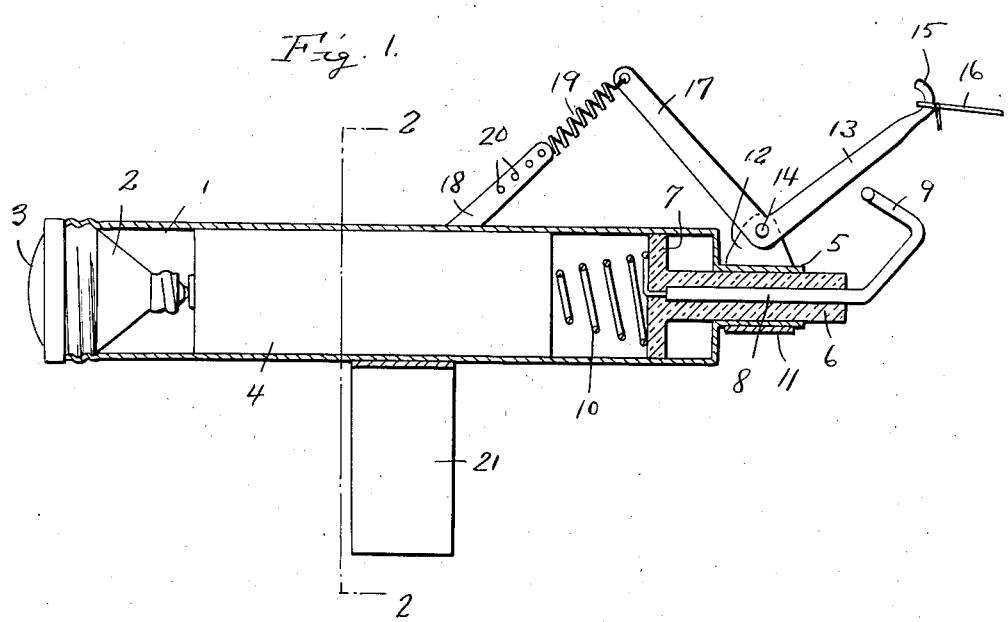
Figure 1 is a vertical longitudinal sectional view of a signal constructed in accordance with this invention.

Referring to the drawings in detail, it will be seen that the reference numeral 1 designates a substantially cylindrical casing in the forward open end of which is detachably threaded a conventional reflector 2 carrying the lens 3 and having therein an incandescent bulb in electrical contact with the battery 4 mounted in said casing 1.

Extending from the opposite end of the casing 1 is a reduced tube 5 having communication with the interior of said casing. An insulating core 6 is disposed through the tube 5 and has formed integrally on its inner end within the casing 1 a circular head 7 which fits snugly within said casing. A contact member 8 is mounted longitudinally in the core 6 and projects from the free end thereof and terminates in the acutely angled contact portion 9. The inner end of the member 8 is electrically connected with one end of the coil spring of current conducting material 10 which impinges the head 7 and, at its opposite end, impinges the contact on the adjacent end of the battery 4 for electrical connection therewith.

A clamp 11 is mounted on the extension tube 5 and has formed thereon an apertured ear 12 to which the switch blade 13 is pivotally connected as at 14. At its free end, the switch blade 13 has formed thereon a hook 15 around which the fishing line 16 is looped. As will be apparent, the blade 13 is engageable with the portion 9 of the contact member 8 to cause the illumination of the light. The pivoted end of the switch blade 13 has formed integrally thereon and extending at right angles thereto an apertured arm 17 which is connected to the arm 18 through the medium of the coil spring 19. The arm 18 is provided with a longitudinally spaced series of openings 20 with which the coil spring 19 may be selectively engaged in a manner to adjust the pull of said coil spring on the switch blade 13, as will be apparent.

Figure 2:
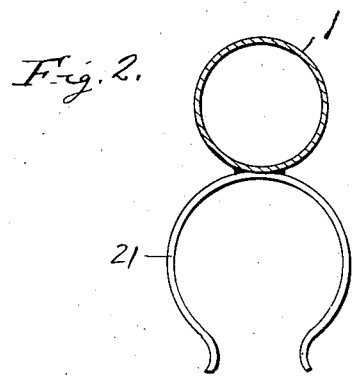
Figure 2 is a view in cross section taken through the casing substantially on the line 2—2 of Figure 1 showing the supporting clamp in front elevation.

A substantially inverted U-shaped resilient clamp 21 is rigidly secured to an intermediate portion of the casing 1 by any suitable means, such as welding, soldering or riveting as illustrated to advantage in Figure 2 of the drawings.

In use, the clamp 21 is mounted on the fishing pole (not shown) preferably at a point between the reel and the handle with the lens 3 disposed toward the rear. The fishing line 16 is then connected to the hook 15 and thus when said line is pulled by a fish, the switch blade 13 is swung into engagement with the portion 9 of the contact member 8 against the tension of the coil spring 19 and the electric circuit is completed for illuminating the light. When the line is released, the spring 19 disengages the contact elements for extinguishing the light, as will be readily apparent.

It is believed that the many advantages of a signal constructed in accordance with this invention will be readily understood, and although the preferred embodiment of the invention is as illustrated and described, it is to be understood that changes in the details of construction may be had which will fall within the scope of the invention as claimed.

What is claimed is:—

1. A signal for fishing tackle comprising a casing, means for detachably mounting the casing on a fishing pole, a battery in the casing, a lamp unit in one end portion of the casing in engagement with the adjacent end of the battery, a reduced, integral, tubular extension on the opposite end of the casing projecting longitudinally therefrom and communicating therewith, an insulating core disposed longitudinally through the tubular extension and projecting therefrom into the casing, an integral circular head on the inner end of the core, a contact member disposed longitudinally in the core and projecting from the outer end thereof, the projecting outer end portion of the contact member being disposed at an angle with respect to said contact member, a coil spring impinged against the head on the core and the adjacent opposed end of the battery for electrical connection therewith, said coil spring electrically connected with the contact member, and means for electrically connecting the contact member with the casing in a manner to energize the lamp unit.

2. A signal of the character described comprising a battery casing, a core of electricity insulating material extending through the wall of the casing, a head formed integrally on the inner end of the core, a contact member mounted in the core and projecting from the outer end thereof, a switch blade engageable with the outer end portion of the contact member, a coil spring in the casing having one end electrically engaged with the battery and its other end engaged with the head and electrically connected with the contact member, and means for mounting the casing on a support.

In testimony whereof I affix my signature.

LEONE G. BACON.